Figure 1:
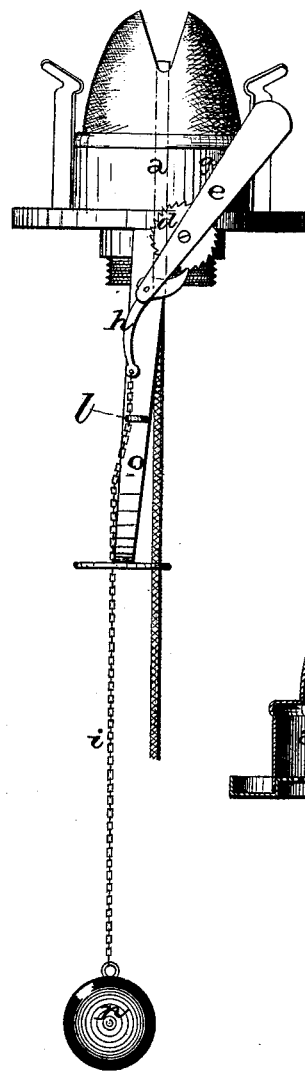
Figure 2:
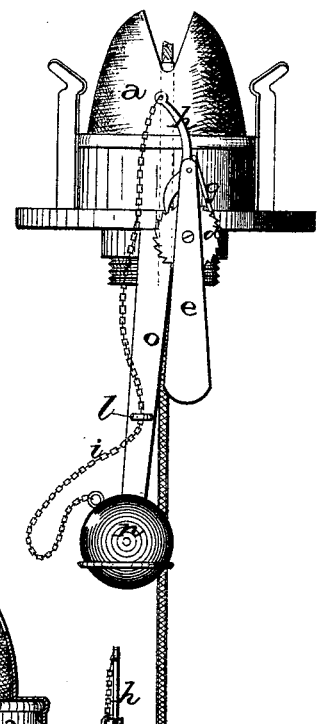
Figure 3:
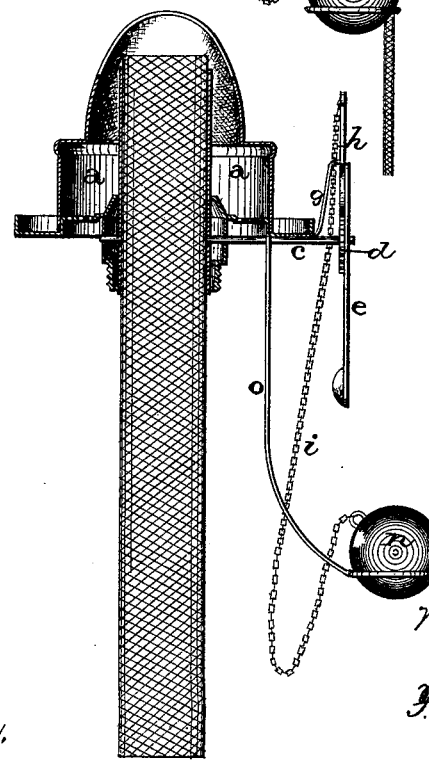

M. WATERBURY.
LAMP-EXTINGUISHER.

No. 190,650. Patented May 8, 1877.

WITNESSES:
J. Wm. Garner
F. M. Burnham

INVENTOR:
Milan Waterbury
per
F. A. Lehmann, Atty

UNITED STATES PATENT OFFICE.

MILAN WATERBURY, OF MASON CITY, IOWA.

IMPROVEMENT IN LAMP-EXTINGUISHERS.

Specification forming part of Letters Patent No. 190,650, dated May 8, 1877; application filed January 27, 1877.

*To all whom it may concern:*

Be it known that I, MILAN WATERBURY, of Mason city, in the county of Cerro Gordo and State of Iowa, have invented certain new and useful Improvements in Lamp-Extinguishers; and I do hereby declare the following to be a full, clear, and exact description of the invention, such as will enable others skilled in the art to which it pertains to make and use it, reference being had to the accompanying drawings, which form part of this specification.

My invention relates to an improvement in lamp-extinguishers; and it consists in securing a ratchet-wheel on the shaft that is used for raising and lowering the wick, and pivoting a weighted lever, which carries a dog on its upper end, to the end of the shaft outside of the ratchet, so that when the ball, which is connected by means of a chain with the dog, falls from its support by the upsetting of the lamp, the dog turns the ratchet around sufficiently far to turn the wick so far down into its tube as to instantly extinguish the flame, all of which will be more fully described hereinafter.

The accompanying drawings represent my invention.

$a$ represents a common burner, of any desired construction, and $c$ the shaft for raising and lowering the wick. Rigidly fastened near the outer end of this shaft is the small ratchet-wheel $d$, by means of which the shaft is operated. Pivoted upon the shaft next to the wheel is a weighted lever, $e$, which can turn freely around in either direction until it strikes the stop $g$, which projects out from the side of the burner. Pivoted to the inner side of the upper end of this lever is a dog $h$, the shorter end of which is so formed as to engage with the ratchet-wheel $d$, while the outer and longer end has the chain or cord $i$ fastened to it. The lower end of this chain passes through a loop or guide, $l$, and is fastened to a ball or weight, $n$, which is held in a ring on the lower end of the support $o$, which hangs down a suitable distance below the burner.

The size of the flame is first adjusted by turning the ratchet-wheel by hand, and when the weighted lever $e$ automatically turns upward toward the left until it strikes against the stop $g$, and stands in a vertical position. The lower end of the dog catches in the ratchet-wheel, so that when the lamp is accidentally upset, and the ball or weight displaced from its support, the upper ends of the dog and lever are drawn downward with a jerk, thereby causing the ratchet-wheel to be turned about one-half around, so as to turn the wick so far downward in its tube as to instantly extinguish the flame, and prevent the oil from catching fire in case the lamp should be broken or the oil spilled.

By making the spurs of the wick-wheels sharp instead of blunt, as is usual, the wick can be raised or lowered much more easily, and by regulating the distance that the spurs shall catch in the wick, the distance the wick shall be turned downward by the dog is easily regulated.

To extinguish the flame at night, or whenever desired, the lower end of the weighted lever has only to be turned partially around toward the right, or the ratchet moved by hand in the usual way.

To turn the wick up, the dog is moved out of contact with the ratchet by the first finger, and then the ratchet moved by the thumb and second finger.

Having described my invention, I claim—

1. The combination of the shaft for operating the wick, ratchet, dog, lever, and a weight connected thereto, substantially as set forth.

2. The combination of the shaft, ratchet, dog, lever, stop-pin, and a ball and chain, substantially as described.

In testimony that I claim the foregoing I have hereunto set my hand this 15th day of January, 1877.

MILAN WATERBURY.

Witnesses:
JOHN D. GLASS,
C. H. HUGHES.